United States Patent [19]

Ozawa et al.

[11] Patent Number: 5,184,290
[45] Date of Patent: Feb. 2, 1993

[54] SWITCHING REGULATOR

[75] Inventors: Kenichi Ozawa; Shinichi Suekane, both of Kanagawa, Japan

[73] Assignee: Stanley Electric Co., Ltd., Tokyo, Japan

[21] Appl. No.: 853,066

[22] Filed: Mar. 17, 1992

[30] Foreign Application Priority Data

Mar. 3, 1991 [JP] Japan .................. 3-29386[U]

[51] Int. Cl.$^5$ ............................. H02M 3/335
[52] U.S. Cl. ........................ 363/21; 363/97; 323/281; 323/902
[58] Field of Search ............ 363/16, 18, 19, 20, 363/21, 95, 97, 131; 323/281, 284, 902

[56] References Cited

U.S. PATENT DOCUMENTS

| | | | |
|---|---|---|---|
| 4,631,654 | 12/1986 | Houee et al. | 363/21 |
| 4,849,869 | 7/1989 | Tanuma et al. | 363/21 |
| 4,956,761 | 9/1990 | Higashi | 363/21 X |
| 5,063,491 | 11/1991 | Shigeo | 363/21 X |

*Primary Examiner*—Emanuel T. Voeltz
*Attorney, Agent, or Firm*—Nixon & Vanderhye

[57] ABSTRACT

In a switching regulator, input voltage is applied to a primary coil of a transformer through a location between a collector and an emitter of a switching transistor connected in series to the primary coil of the transformer. A pair of output terminals are connected to a secondary coil of the transformer through a rectifier smoothing circuit. A comparator compares output voltage occurring between the output terminals with reference voltage to generate an output signal. On the basis of the output signal, a control circuit applies a drive control signal to a base of the switching transistor. The reference voltage is given such that first voltage maintained substantially constant and second voltage such as outside input voltage or the like capable of being regulated over a relatively large varying width are added to each other.

14 Claims, 1 Drawing Sheet

SWITCHING REGULATOR

BACKGROUND OF THE INVENTION

The present invention relates to switching regulators and, more particularly, to a switching regulator in which regulation or adjustment of output voltage is possible over a relatively wide range.

A conventional switching regulator has been arranged, for example, as shown in FIG. 2 of the attached drawings. Specifically, the switching regulator 1 is arranged such that D.C. voltage inputted from a D.C. power source (not shown) through a pair of input terminals 2 and 2 is applied to a primary coil 4a of a transformer 4 through a switching transistor 3, and a pair of output terminals 6 and 6 are connected to a secondary coil 4b of the transformer 4 through a rectifier smoothing circuit 5. When output voltage occurring between the output terminals 6 and 6 is inputted to an output-voltage control circuit 7, the output-voltage control circuit 7 controls oscillation of the switching transistor 3 due to a drive control circuit 9, through a photocoupler 8, on the basis of the above-described output voltage.

In the output-voltage control circuit 7, the aforesaid output voltage is directly inputted to one of a pair of input terminals of a comparator 7a, while the aforementioned output voltage is inputted to the other input terminal of the comparator 7a through a power source 7b variable in voltage. That is, voltage occurring at both ends of the power source 7b is inputted to the other input terminal of the comparator 7a, as a predetermined reference voltage. Accordingly, the comparator 7a compares the aforementioned output voltage and the reference voltage with each other to output a signal. The output signal from the comparator 7a is inputted to one of a pair of input terminals of the other comparator 7c, and a pulse signal from an oscillation circuit 7d is inputted to the other input terminal of the comparator 7c. In the case where the output voltage is higher than the reference voltage, a signal of an H-level is outputted from the comparator 7c, while, in the case where the output voltage is lower than the reference voltage, a signal of a L-level is outputted from the comparator 7c.

With the arrangement described above, in the case where the output signal from the comparator 7c is the H-level, a luminous section of the photocoupler 8 does not emit light or luminesce, because voltage required for luminescence is not applied to the luminous section. Accordingly, a signal is not inputted to the drive control circuit 9. On the other hand, in the case where the output signal from the comparator 7c is the L-level, the luminous section of the photocoupler 8 luminesces, because voltage required for luminescence is applied to the luminous section. Accordingly, a signal is inputted to the drive control circuit 9. Thus, the drive control circuit 9 controls oscillation of the switching transistor 3 on the basis of the above-described pulse signal. In this manner, the output voltage can be maintained to predetermined voltage.

However, the switching regulator 1 described above is arranged such that the output voltage is substantially equalized to predetermined voltage which is set beforehand. The switching regulator 1 is provided with the power source 7b variable in voltage for regulating the reference voltage. In the case, however, where the output voltage shifts from the predetermined voltage, the power source 7b variable in voltage is one for regulating the output voltage to the predetermined voltage, and has a regulating range or region which is relatively small or narrow. Accordingly, it is difficult to regulate the output voltage over a relatively wide range. For this reason, there is the following problem. That is, in the case where the output voltage is modified or altered to output voltage which exceeds or is out of the regulating range, the switching regulator per se must be replaced by another one.

SUMMARY OF THE INVENTION

It is an object of the invention to provide a switching regulator capable of regulating output voltage over a relatively wide range.

According to the invention, there is provided a switching regulator comprising;
- a transformer having a primary coil and a secondary coil;
- a switching transistor having a base, a collector and an emitter, the switching transistor being connected in series to the primary coil of the transformer;
- wherein input voltage is applied to the primary coil of the transformer through a location between the collector and the emitter of the switching transistor,
- a rectifier smoothing circuit;
- a pair of output terminals connected to the secondary coil of the transformer through the rectifier smoothing circuit,
- a comparator for comparing output voltage occurring between the output terminals with reference voltage to generate an output signal; and
- a control circuit for applying a drive control signal to the base of the switching transistor on the basis of the output signal from the comparator; and
- wherein the reference voltage is given such that first voltage maintained substantially constant and second voltage such as outside input voltage capable of being regulated over a relatively large varying width are added to each other.

With the above arrangement of the invention, the reference voltage for regulating the output voltage is given by addition of the substantially constant first voltage and the freely variable second voltage to each other, whereby a varying width of the reference voltage is remarkably widened with respect to a relatively narrow varying width achievable of attainable by regulation of a variable resistance connected in series to the conventional output terminal. Accordingly, the second voltage is regulated whereby the output voltage can substantially freely be regulated. In the case where the output voltage is desired to fluctuate over a relatively wide range, it is unnecessary that the switching regulator per se is modified in design, and is replaced by another one, and can be utilized as it is. Thus, effective utilization of the switching regulator is possible.

As described above, according to the invention, there is provided the extremely superior switching regulator in which the output voltage can be regulated over a relatively wide range.

DETAILED DESCRIPTION OF THE DRAWINGS

Figure 1:
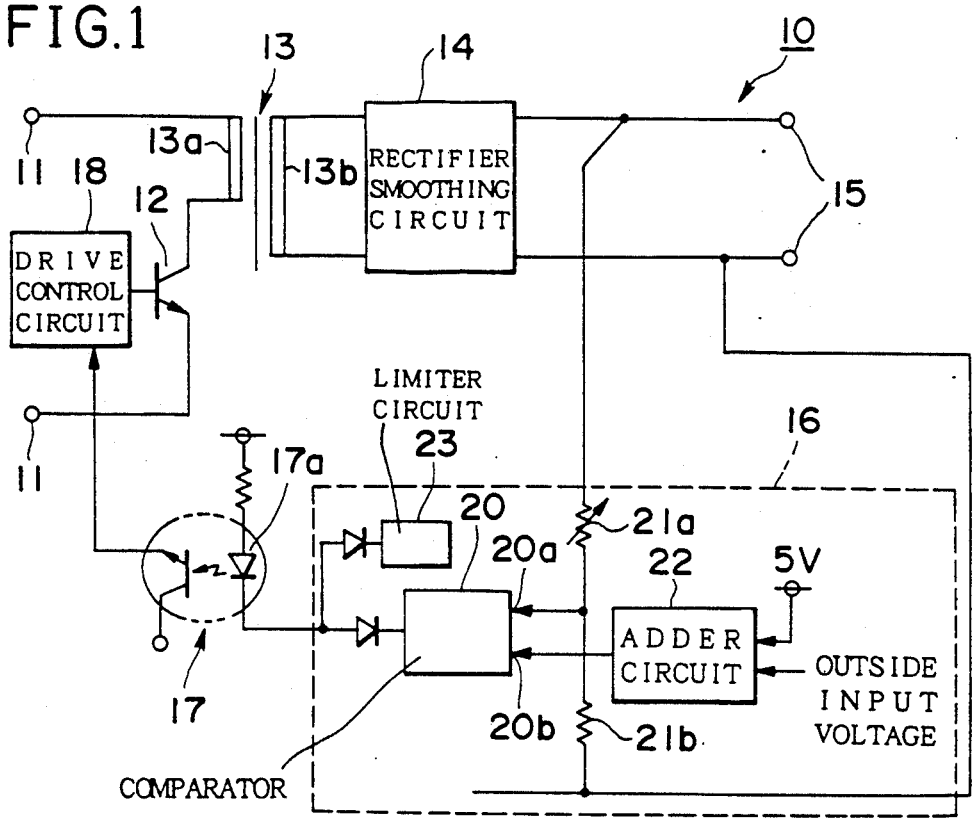
Figure 2:
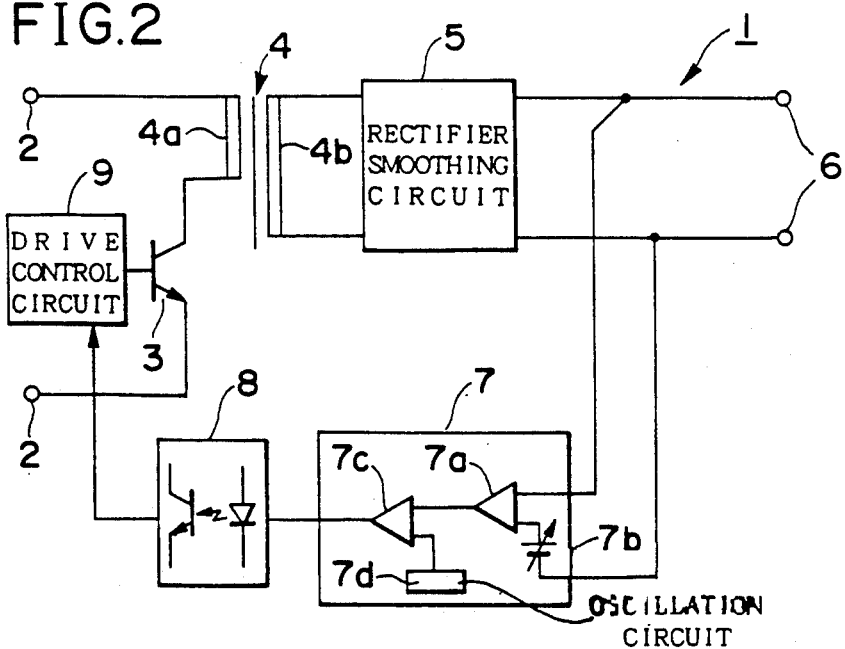

FIG. 1 is a circuit view showing an embodiment of a switching regulator according to the invention; and FIG. 2 is a circuit view showing an example of a conventional switching regulator.

DESCRIPTION OF THE EMBODIMENTS

The invention will hereunder be described in detail with reference to an embodiment illustrated in FIG. 1.

FIG. 1 shows an embodiment of a switching regulator according to the invention. The switching regulator 10 is arranged such that D.C. voltage inputted from a D.C. power source (not shown) through a pair of input terminals 11 and 11 is applied to a primary coil 13a of a transformer 13 through a switching transistor 12, and a pair of output terminals 15 and 15 are connected to a secondary coil 13b of the transformer 13 through a rectifier smoothing circuit 14. When output voltage occurring between the output terminals 15 is inputted to an output-voltage control circuit 16, the output-voltage control circuit 16 controls oscillation of the switching transistor 12 due to a drive control circuit 18, through a photocoupler 17, on the basis of the aforesaid output voltage.

The above-described arrangement is similar to that of the conventional switching regulator 1 shown in FIG. 2. In the switching regulator 10 according to the invention, however, the output-voltage control circuit 16 is arranged such that, as shown in FIG. 1, the output voltage is inputted to one of a pair of input terminals 20a of a comparator 20 through a pair of tap or potential resistors 21a and 21b, and voltage in which fixed voltage of, for example, 5 V and outside input voltage capable of being optionally altered and regulated are added to each other in inputted, as a reference voltage, to the other input terminal 20b of the comparator 20 through an adder circuit 22. Accordingly, the comparator 20 compares the aforesaid output voltage and the aforesaid reference voltage with each other, and outputs a signal of an H-level in the case where the aforementioned output voltage is higher than the reference voltage, and a signal of a L-level in the case where the output voltage is lower than the reference voltage.

In the case where the output signal from the comparator 20 is the H-level, a luminous section 17a of the photocoupler 17 does not luminesce, because voltage required for luminescence is not applied to the luminous section 17a. Accordingly, a signal is not inputted to the drive control circuit 18. On the other hand, in the case where the output signal from the comparator 20 is the L-level, the luminous section 17a of the photocoupler 17 luminesces, because voltage required for luminescence is applied to the luminous section 17a. Accordingly, a signal is inputted to the drive control circuit 18. Thus, the drive control circuit 18 controls oscillation of the switching transistor 12 on the basis of the aforesaid signal. In this manner, the output voltage can be maintained to predetermined voltage.

At this time, since the above-described outside input voltage can be regulated to an optional voltage value, it is possible also to bring the reference voltage to desired voltage. Accordingly, the outside input voltage is regulated over a wide range, whereby the reference voltage or the output voltage can be regulated over a relatively wide range.

Here, it is possible to freely raise the outside input voltage. Accordingly, when the output voltage rises correspondingly as it is, there may be a case where, if circumstances require, parts or elements on the secondary side are destroyed or broken. Thus, a limiter circuit 23 may be provided in parallel to the output terminals of the comparator 20. The limiter circuit 23 is arranged such that, when, for example, the outside input voltage is brought to one equal to or higher than predetermined voltage, a signal of an H-level is outputted to bring voltage applied to the luminous section 17a of the photocoupler 17 forcibly to a value equal to or lower than voltage required for luminescence, thereby preventing the luminous section 17a from luminescing.

In connection with the above, it is needless to say that the output voltage of the switching regulator can be regulated to an optional voltage value by the arrangement according to the invention, even if the output voltage of the switching regulator is on the side of + or −.

What is claimed is:

1. A switching regulator comprising: a transformer having a primary coil and a secondary coil;
   a switching transistor having a base, a collector and an emitter, said switching transistor being connected in series to said primary coil of said transformer;
   wherein input voltage is applied to said primary coil of said transformer through said collector and said emitter of said switching transistor,
   a pair of output terminals connected to said secondary coil of said transformer;
   a comparator for comparing output voltage occurring between said output terminals with a variable reference voltage to generate an output signal; and
   a control circuit for applying a drive control signal to said base of said switching transistor on the basis of said output signal from said comparator.

2. A switching regulator according to claim 1, further comprising:
   a potential resistor, wherein said output voltage is connected to one of a pair of input terminals of said comparator through said potential resistor.

3. A switching regulator according to claim 2, wherein said potential resistor is variable.

4. A switching regulator according to claim 1, including a photocoupler interposed between an output terminal of said comparator and said control circuit.

5. A switching regulator according to claim 2, including a photocoupler interposed between an output terminal of said comparator and said control circuit.

6. A switching regulator according to claim 3, including a photocoupler interposed between an output terminal of said comparator and said control circuit.

7. A switching regulator according to claim 4, wherein said photocoupler has a luminous element, and wherein said switching regulator further comprises:
   a limiter which inhibits said luminous section when said input voltage equals a predetermined voltage.

8. A switching regulator according to claim 1, wherein said variable reference voltage is the sum of a fixed voltage and an external, alterable voltage, said sum being inputted to one of a pair of input terminals of said comparator as said variable reference voltage.

9. A switching regulator according to claim 7, wherein said limiter is provided in parallel to an output terminal of said comparator.

10. A switching regulator according to claim 7, wherein said limiter outputs a first logic level signal when said input voltage equals said predetermined voltage, to limit voltage applied to said luminous element to a value that prevents luminescence of said luminous element.

11. A switching regulator according to claim 1, wherein said variable reference voltage is generated from a substantially constant first voltage and a variable second voltage.

12. A switching regulator according to claim 1, further comprising:

a rectifier smoothing circuit connected between said secondary coil and said output terminals.

13. A switching regulator according to claim 1, wherein said variable reference voltage may be varied to accommodate changes in said output voltage.

14. A switching regulator according to claim 1, wherein said variable reference voltage may be varied to accommodate changes in said input voltage.

* * * * *